US008230795B2

(12) United States Patent
Morin et al.

(10) Patent No.: US 8,230,795 B2
(45) Date of Patent: Jul. 31, 2012

(54) CIRCULATING FLUIDIZED BED DEVICE PROVIDED WITH AN OXYGEN-FIRED FURNACE

(76) Inventors: Jean-Xavier Morin, Neuville Aux Bois (FR); Corinne Beal, Voisins le Bretonneux (FR); Silvestre Suraniti, Aix en Provence (FR)

( * ) Notice: Subject to any disclaimer, the term of this patent is extended or adjusted under 35 U.S.C. 154(b) by 238 days.

(21) Appl. No.: 11/921,585

(22) PCT Filed: Jun. 14, 2006

(86) PCT No.: PCT/EP2006/063228
§ 371 (c)(1),
(2), (4) Date: Dec. 5, 2007

(87) PCT Pub. No.: WO2006/134134
PCT Pub. Date: Dec. 21, 2006

(65) Prior Publication Data
US 2009/0133611 A1 May 28, 2009

(30) Foreign Application Priority Data
Jun. 15, 2005 (FR) ..................... 05 51621

(51) Int. Cl.
*F23B 10/02* (2011.01)
*F23B 70/00* (2006.01)
*F23G 5/027* (2006.01)
(52) U.S. Cl. ......... 110/211; 110/245; 110/216; 110/229
(58) Field of Classification Search .................. 110/210, 110/211, 212, 213, 216, 245
See application file for complete search history.

(56) References Cited

U.S. PATENT DOCUMENTS

| 4,517,906 | A | * | 5/1985 | Lewis et al. | 110/346 |
| 4,970,969 | A | * | 11/1990 | Koptis et al. | 110/190 |
| 5,048,432 | A | | 9/1991 | Hofmann et al. | |
| 5,159,886 | A | * | 11/1992 | Schaub et al. | 110/347 |
| 6,383,461 | B1 | * | 5/2002 | Lang | 110/345 |
| 6,383,462 | B1 | * | 5/2002 | Lang | 110/345 |
| 6,505,567 | B1 | * | 1/2003 | Anderson et al. | 110/344 |
| 6,691,628 | B2 | * | 2/2004 | Meyer et al. | 110/345 |
| 2009/0120338 | A1 | * | 5/2009 | Adendorff et al. | 110/345 |

FOREIGN PATENT DOCUMENTS
EP 0 406 185 1/1991

OTHER PUBLICATIONS

PCT International Search Report (PCT/EP2006/063228) dated Sep. 27, 2006.
Written Opinion of the International Searching Authority (PCT/EP2006/063228) dated Sep. 27, 2006.

* cited by examiner

*Primary Examiner* — Kenneth Rinehart
*Assistant Examiner* — David J Laux
(74) *Attorney, Agent, or Firm* — Lawrence P. Zale

(57) ABSTRACT

The invention relates to a circulating fluidized bed device provided with an oxygen-fired furnace (1), a separator (2) for separating gas and solid particles, a return circuit for returning solids to the furnace (3), and an outlet duct (4) leaving the separator and conveying gases to a heat-recovery boiler, the device being characterized in that it includes injector means for injecting combustible) gas into the outlet from the separator 2), said combustible gas being propelled by recycled carbon dioxide into the residual vortex created at the outlet from the separator, so as to ensure intimate mixing takes place in the downstream duct (4) with the combustion flue gases, thereby reducing the oxygen content of said flue gases by residual combustion.

16 Claims, 1 Drawing Sheet

CIRCULATING FLUIDIZED BED DEVICE PROVIDED WITH AN OXYGEN-FIRED FURNACE

TECHNICAL FIELD

The present invention relates to a circulating fluidized bed device provided with an oxygen-fired furnace, a separator for separating gas and solid particles, a circuit for returning solids to the furnace, and an outlet duct leaving the separator and taking gas to a heat-recovery boiler.

BACKGROUND

It is known to use oxygen as the oxidizing agent instead of air in boilers for producing energy.

The advantage of using oxygen as the oxidizing agent is the reduction or elimination of the nitrogen ballast diluting the carbon dioxide contained in the flue gases and coming from the nitrogen contained in the combustion air, and also the significant reduction in the dimensions of the equipment needed.

The application of this principle to a circulating fluidized bed boiler is disclosed in U.S. Pat. No. 6,505,567. According to that document, a steam generator or circulating fluidized bed boiler furnace includes means for introducing substantially pure oxygen into the generator.

The technical advantage of a circulating fluidized bed is that it enables heat to be extracted from the loop of circulating solids and it enables a low combustion temperature to be conserved that is decoupled from the oxygen content of the oxidizing agent. That technique is thus particularly attractive, and makes it possible to maximize the oxygen fraction in the oxidizing agent and to minimize the size of the boiler, which size depends directly on the rate at which flue gases are produced.

In that technique, the flue gases emitted by the combustion equipment are constituted mainly by carbon dioxide and by water vapor.

Nevertheless, such flue gases also contain a small fraction of non-condensible gas, including oxygen. This oxygen content typically lies in the range 3% to 5% relative to dry gas and cannot be reduced below a minimum threshold of about 2.5%, which is imposed by the quality of combustion and by safety constraints.

The quality of combustion is represented by the CO content in the flue gases produced and by the unburnt solids contained in the combustion by-products.

Unfortunately, the maximum oxygen content that can be accommodated in the specifications for $CO_2$ treatment systems, and above all in transport networks, can be of the order of 100 parts per million by volume (ppm vol), with this requirement being due mainly to the risks of corrosion to equipment conveying $CO_2$, which risk is made worse by the presence of water vapor. For carbon steel pipelines, a mixture of gases $CO_2$, $SO_2$, $H_2O$, and $O_2$ can be incompatible, depending on its proportions, with satisfactory long-term mechanical performance.

It is thus essential to reduce significantly or even to eliminate the oxygen content from the flue gases that are given off, before they penetrate into the $CO_2$ treatment station.

It is known to carry out this reduction in oxygen content by additional catalytic treatments that are complex and that lead to large investment and operating costs.

Furthermore, European patent No. 0 497 418 discloses a method of burning coal in an air circulating fluidized bed boiler that includes a zone in which coal is mixed with hot solid materials coming from the combustion chamber, whereby, at the outlet from a separator for separating gas and solid particles, carbonization gas (also known as pyrolysis gas) produced in said mixing zone is drawn off and added to the combustion gas containing oxygen and leaving the separator, the carbonization gas being burned in such a manner as to raise the temperature to a value in the range 900° C. to 1200° C. in order to reduce nitrous oxide.

The invention relates to a circulating fluidized bed device in which combustion is performed by means of a mixture of oxygen and carbon dioxide capable of containing 21% to 100% oxygen.

The invention proposes adapting this method of using combustible gas, more particularly pyrolysis gas, that is known for an air-fired furnace, to an oxygen-fired furnace for the purpose of eliminating residual oxygen from the combustion gas.

SUMMARY

According to the aspects illustrated herein, there is provided a circulating fluidized bed device provided with an oxygen-fired furnace, a separator that separates gas and solid particles, a return duct that returns the solid particles to the furnace, an outlet duct leaving the separator, and an injection device that provides a combustible gas into the outlet duct from the separator. The said combustible gas is propelled by recycled carbon dioxide into a residual vortex created at the outlet duct from the separator, so as to ensure intimate mixing takes place in the outlet duct with the combustion flue gases, thereby reducing the oxygen content of said flue gases by residual combustion.

The invention enables the oxygen content of the carbon dioxide coming from the combustion equipment to be reduced significantly, so as to make the carbon dioxide compatible with the constraints imposed by the transport network, and without needing any recourse to expensive catalytic treatments.

The residual vortex at the outlet from the separator is characterized by the flow of flue gases from the combustion rotating about a vertical axis. The residual vortex can be accentuated by appropriately selecting dimensions for the separator, and it can constitute a reaction zone that is favorable for mixing gases.

According to the other aspects illustrated herein, the combustible gas may be natural gas or pyrolysis gas, which is taken from said return duct downstream from the point where fuel is introduced into the furnace.

According to the other aspects illustrated herein, the injection device includes two tubes feeding injectors distributed around the periphery of said outlet duct, each injector including an inner tube and an outer tube, the inner tube injecting combustible gas and the outer tube injecting recycled carbon dioxide.

According to the other aspects illustrated herein, there further includes a device to inject recycled carbon dioxide at an adjustable flow rate into the pryolysis gas upstream from the injection device into the outlet duct from the separator.

BRIEF DESCRIPTION OF THE DRAWINGS

The invention is described below in greater detail with reference to the figures which merely show a preferred embodiment of the invention.

DETAILED DESCRIPTION

Figure 1:
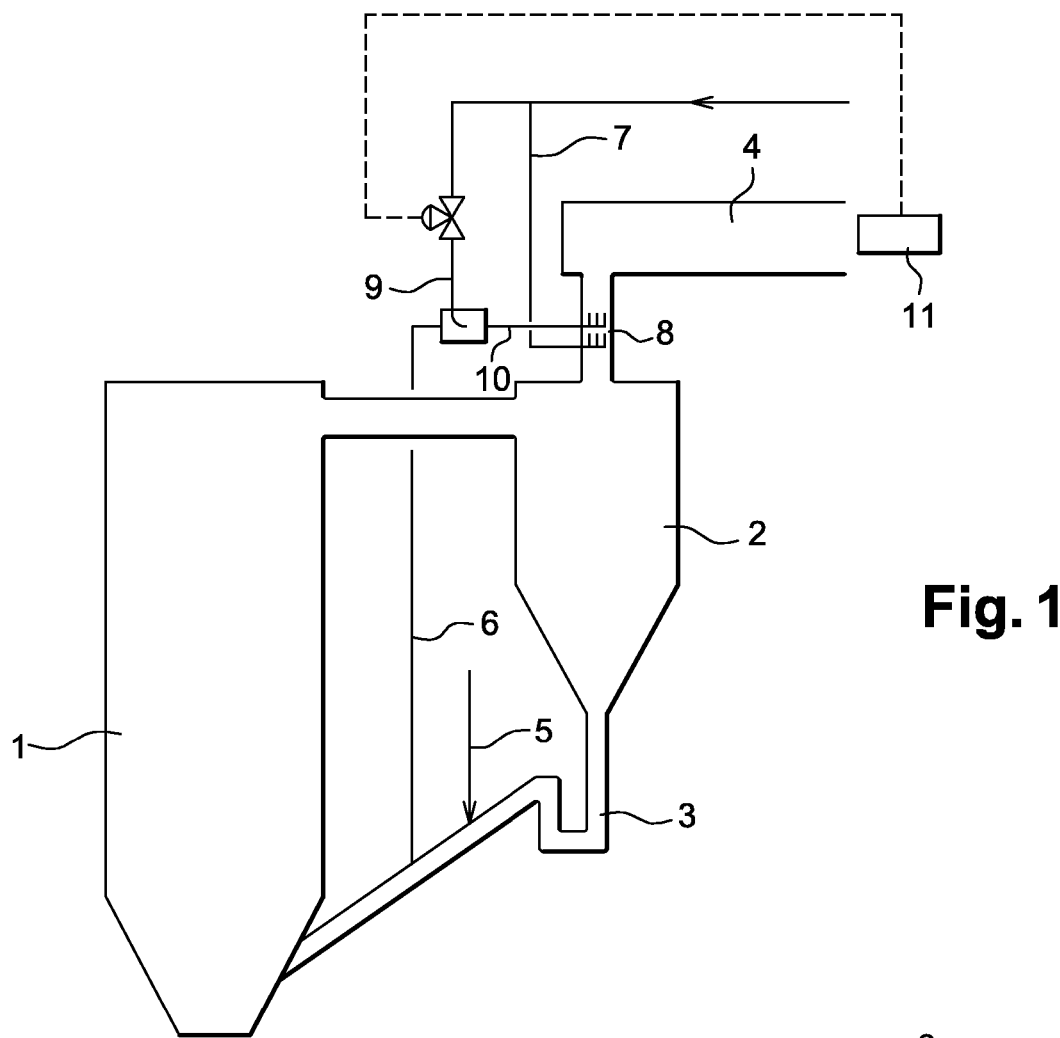
FIG. 1 is a diagrammatic vertical section view of a circulating fluidized bed boiler in accordance with the invention.

As shown in FIG. 1, a circulating fluidized bed device is provided with an oxygen-fired furnace 1, a separator 2 for separating gas and solid particles, a return circuit 3 for returning solids to the furnace, and an outlet duct 4 leaving the separator and conveying the combustion flue gases towards a heat-recovery boiler (not shown).

The device includes injector means 8 for injecting combustible gas into the outlet from the separator 2, this combustible gas being propelled by recycled carbon dioxide into the residual vortex created at the outlet from the separator in such a manner as to ensure that intimate mixing takes place in the duct 4 with the combustion flue gases, thereby reducing the oxygen content of said flue gases by residual combustion.

Said combustible gas may be natural gas or pyrolysis gas taken from the ceiling of the return duct 3 downstream from the point where fuel is introduced into the furnace 1. It may also be a mixture of both of these types of gas.

In the embodiment shown, the combustible gas is pyrolysis gas taken from the ceiling of the return duct 3 downstream from the point where fuel is introduced into the furnace 1.

The oxy-fuel circulating fluidized bed boiler, i.e. in which fuel is combusted by means of a mixture of oxygen and carbon dioxide, is characterized by a flow of flue gases and correspondingly by dimensions for the furnace and the separator that are considerably smaller than those of an air boiler. For example, for an oxidizer mixture comprising 70% $O_2$ and 30% recycled $CO_2$, the flue gas flow rate is about 30% the flue gas rate when operating with air. Consequently, for a flow rate of circulating solids kept equal to that when operating with air, the concentration of solids entrained by the flue gases and circulating round the loop must be considerably higher in a manner that is practically proportional.

As a result, the pressure gradient in the furnace 1 is greater and the head loss in the separator 2 is also greater, thereby creating a pressure difference between the point where pyrolysis gas is taken from the return duct 3 and the point where injection takes place into the outlet duct 4 of the separator, which pressure difference is sufficient to ensure that the gas flows naturally.

In a preferred embodiment, the pyrolysis gas is taken and injected merely via a lagged duct 6 branching from the top generator line of the return duct 3 and going to injection holes situated downstream and only downstream from the separator 2 in order to take advantage of the residual vortex. This injection is preferably performed into the vertical duct directly at the outlet from the separator.

In a variant, it is possible to perform this injection into the horizontal portion of the duct 4 connecting the separator 2 to the heat-recovery boiler.

The effectiveness of this reduction in oxygen content from a few percent to about 100 ppm depends on having a temperature of about 900° C. at the outlet from the separator, a transit time that is sufficiently long, and sufficient turbulence provided by the residual vortex to ensure that the gaseous species, i.e. residual oxygen and combustible gas in the present example, are mixed together.

To improve the penetration of the combustible gas jet into the rotating flow of flue gases, it is preferable to use recycled carbon dioxide. This injection of combustible gas can be performed using two injection tubes 8 feeding injectors distributed around the periphery of the duct 4, each injector being constituted by two concentric tubes, an inner tube injecting combustible gas and an outer tube injecting recycled carbon dioxide.

The rate at which combustible gas is injected in the invention is controlled by an oxygen analyzer 11 placed upstream from the heat-recovery boiler on the flue gas circuit. This location is normally used for the oxygen analyzer that performs main regulation of the boiler, which analyzer, when the invention is applied, is placed upstream from the point 8 where the gases are injected.

When using pyrolysis gas, the flow rate of combustible gas is controlled by injecting recycled carbon dioxide at an adjustable rate 9 into the pyrolysis gas duct.

This addition of carbon dioxide can vary between a zero rate so as to maximize the flow rate of the pyrolysis gas and a rate that suffices to limit the flow rate of pyrolysis gas to the value required for combining with the residual oxygen contained in the flue gases. This added $CO_2$ flow rate increases head losses downstream and thus reduces the flow rate of combustible gas since that depends on the pressure difference.

Figure 2:
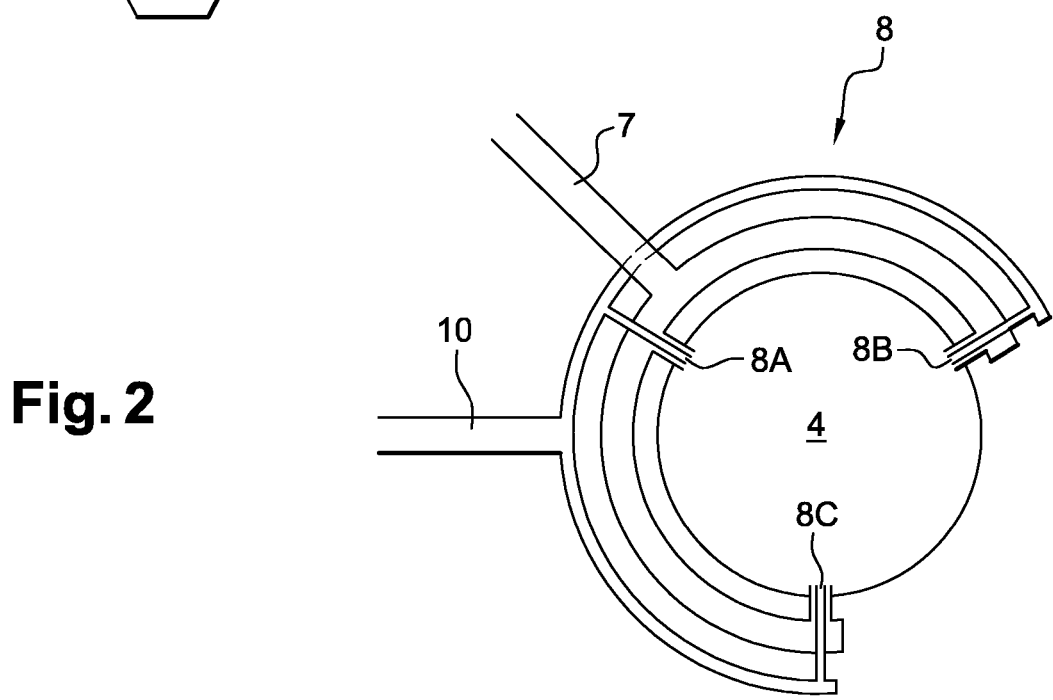
FIG. 2 is a diagrammatic detail view in horizontal section of an embodiment.

FIG. 2 shows an embodiment of two tubes 8 as described above.

The number of injectors 8A, 8B is restricted to a maximum number of 5, and preferably to a maximum number of 3 as shown, so as to ensure good penetration of the jets and uniform distribution of injection.

These injectors are regularly distributed around the periphery of the duct 4, and each is constituted by a pair of concentric tubes, the inner tube injecting the combustible gas and the outer tube injecting recycle carbon dioxide.

A circularly arcuate duct surrounding the flue gas duct 4 is arranged extending the combustible gas inlet duct 10. In this example, the circularly arcuate duct presents three internal injectors opening out into the flue gas duct 4.

In similar manner, and starting from the recycled carbon dioxide outlet duct 7, a second circularly arcuate duct is arranged surrounding the flue gas duct 4. In this example this second circularly arcuate duct presents three outer injectors disposed concentrically around the above-described inner injectors and opening out into the flue gas duct 4.

What is claimed is:

1. A circulating fluidized bed device comprising:
   an oxygen-fired furnace providing a flue gas and solid particles;
   a separator that separates gas and solid particles;
   a return duct that returns the separated solid particles to the furnace;
   an outlet duct leaving the separator, wherein the separated flue gas flows therethrough; and
   an injection device having at least one injector coupled to the return duct that provides a combustible gas and recycled carbon dioxide into the outlet duct wherein the combustible gas naturally flows from the return duct to the at least one injector;
   whereby the recycled carbon dioxide improves the penetration of the combustible gas into the outlet duct, so as to ensure intimate mixing takes place in the outlet duct with the combustion flue gases, thereby reducing the oxygen content of said separated flue gas by residual combustion.

2. The device of claim 1, wherein the combustible gas is pyrolysis gas taken from said return duct downstream from a point where fuel is introduced into the furnace.

3. The device of claim 1, wherein the combustible gas includes natural gas.

4. The device of claim 1, wherein the combustible gas includes pyrolysis gas.

5. The device according to claim 4, further includes a valve that provides recycled carbon dioxide to the pyrolysis gas to control the rate in which the combustible gas is injected into the outlet duct in response to the oxygen level downstream of the outlet of the separator.

6. The device of claim 5, further including an oxygen analyzer that determines the oxygen level.

7. The device of claim 1, wherein the injection device includes at least two injectors distributed around the periphery of said outlet duct, each injector including an inner tube and an outer tube, the inner tube injecting combustible gas and the outer tube injecting recycled carbon dioxide.

8. The device of claim 1, wherein the at least one injector includes an inner tube and an outer tube, the inner tube injecting combustible gas and the outer tube injecting recycled carbon dioxide.

9. The device of claim 8, wherein the at least one injector extends into the outlet duct.

10. The device of claim 8, wherein the recycled carbon dioxide is combined with the combustible gas to propel the combustible gas into the outlet duct.

11. The device of claim 1, wherein the injection device includes a plurality of injectors regularly distributed around the periphery of said outlet duct, each injector being constituted by an inner tube and an outer tube, the inner tube injecting combustible gas and the outer tube injecting recycled carbon dioxide.

12. The device of claim 11, wherein the plurality of injectors includes no more than 3 injectors.

13. The device of claim 11, wherein the plurality of injectors includes no more than 5 injectors.

14. The device of claim 1, wherein the at least one injector propels combustible gas into a residual vortex created at the outlet duct of the separator.

15. The device of claim 1, wherein the at least one injector propels combustible gas into a horizontal portion of the outlet duct of the separator.

16. The device of claim 1, wherein the recycled carbon dioxide is combined with the combustible gas to propel the combustible gas into the outlet duct.

* * * * *